(12) United States Patent
Keyes et al.

(10) Patent No.: US 12,380,129 B1
(45) Date of Patent: Aug. 5, 2025

(54) SYNCHRONOUS CROSS-REGION REPLICATION FOR A MULTI-WRITER DATABASE

(71) Applicant: Amazon Technologies, Inc., Seattle, WA (US)

(72) Inventors: Alexander Richard Keyes, Seattle, WA (US); Somasundaram Perianayagam, Seattle, WA (US); Douglas Brian Terry, San Francisco, CA (US); Akshat Vig, Medina, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/542,024

(22) Filed: Dec. 15, 2023

(51) Int. Cl.
*G06F 16/00* (2019.01)
*G06F 16/25* (2019.01)
(Continued)

(52) U.S. Cl.
CPC ............ *G06F 16/27* (2019.01); *G06F 16/252* (2019.01); *H04L 67/1097* (2013.01)

(58) Field of Classification Search
CPC .... G06F 16/2358; G06F 16/27; G06F 16/273; G06F 16/23; G06F 16/22; G06F 16/2228; G06F 16/2329; G06F 16/2365; G06F 16/275; G06F 16/316; G06F 16/328; G06F 11/1451; G06F 11/1471; G06F 11/2094; G06F 16/181; G06F 2201/80; G06F 3/0619; G06F 3/065; G06F 3/067; G06F 11/1469; G06F 11/181; G06F 11/2097; G06F 11/3089; G06F 11/328; G06F 16/2379; G06F 16/90335; G06F 16/9038; G06F 16/904; G06F 16/9535; G06F 21/645;
(Continued)

(56) References Cited

U.S. PATENT DOCUMENTS 5,937,066 A 8/1999 Gennaro
9,507,843 B1 * 11/2016 Madhavarapu ..... G06F 16/2358
(Continued)

OTHER PUBLICATIONS

Eric Brewer, "Spanner, TrueTime and the Cap Theorem," available at https://static.googleusercontent.com/media/research.google.com/en//pubs/archive/45855.pdf, Feb. 14, 2017, pp. 1-7.
(Continued)

*Primary Examiner* — Shyue Jiunn Hwa
(74) *Attorney, Agent, or Firm* — S. Scott Foster; Kowert, Hood, Munyon, Rankin & Goetzel, P.C.

(57) ABSTRACT

A database table may be synchronously replicated across regions of a provider network. When a write request to an item of the table is received at one region, a local version of the item may be obtained as well as any additional versions of the item corresponding to inflight writes that target the item from a multi-region replication append-only log. An updated version of the item is then generated based on the local version of the item and the additional versions, which is appended to the multi-region replication append-only log. A conditional write is performed to update the local version of the item with the updated version of the item. If successful, a response indicates that the write request was successful.

20 Claims, 8 Drawing Sheets

(51) Int. Cl.
*G06F 16/27* (2019.01)
*H04L 67/1097* (2022.01)

(58) Field of Classification Search
CPC .......... G06F 2201/805; G06F 2201/82; G06F 2201/835; G06F 2201/84
See application file for complete search history.

(56) References Cited

U.S. PATENT DOCUMENTS

| | | |
|---|---|---|
| 10,042,881 B1 | 8/2018 | Hsieh et al. |
| 11,132,381 B2 | 9/2021 | Hsieh et al. |
| 11,520,753 B1 | 12/2022 | Hsieh et al. |
| 11,544,154 B2* | 1/2023 | Horowitz ............ H04L 65/1069 |
| 2017/0177658 A1* | 6/2017 | Lee ..................... G06F 11/1451 |
| 2017/0206236 A1* | 7/2017 | Kharatishvili .......... G06F 16/23 |
| 2021/0160152 A1* | 5/2021 | Spiegelman ........ H04L 67/1001 |
| 2022/0398227 A1 | 12/2022 | Hsieh et al. |
| 2024/0178994 A1 | 5/2024 | Bedington |
| 2024/0184674 A1* | 6/2024 | Kishanlal Joshi .... G06F 11/181 |

OTHER PUBLICATIONS

U.S. Appl. No. 18/757,282, filed Jun. 27, 2024, Sroaj Sosothikul Keyes, et al.

* cited by examiner

Receive a read request for an item of a table replicated across different regions of a provider network, the read request being received at a first region of the regions, and the table being writeable via requests received at individual ones of the different regions
710

Perform the read request
720

Assign a timestamp for the read request
730

Access a multi-region replication append-only log to obtain any inflight write(s) that were received at different ones of the different regions
740

Wait until those inflight write(s) with respective timestamps earlier than the timestamp assigned for the read request have been performed
750

Obtain a local version of the item at the first region
760

Return the local version of the item in response to the read request
770

FIG. 7

SYNCHRONOUS CROSS-REGION REPLICATION FOR A MULTI-WRITER DATABASE

BACKGROUND

Data storage systems often serve applications where access performance can have important impacts on the quality of work performed by the application. Many different factors can contribute to access performance on a database. Techniques that can improve access performance to data sets of data storage systems are thus highly desirable.

BRIEF DESCRIPTION OF THE DRAWINGS

FIG. 7 is a high-level flowchart illustrating various methods and techniques to implement performing a read request for in a synchronous cross-region replication for a multi-writer database, according to some embodiments.

Figure 1:
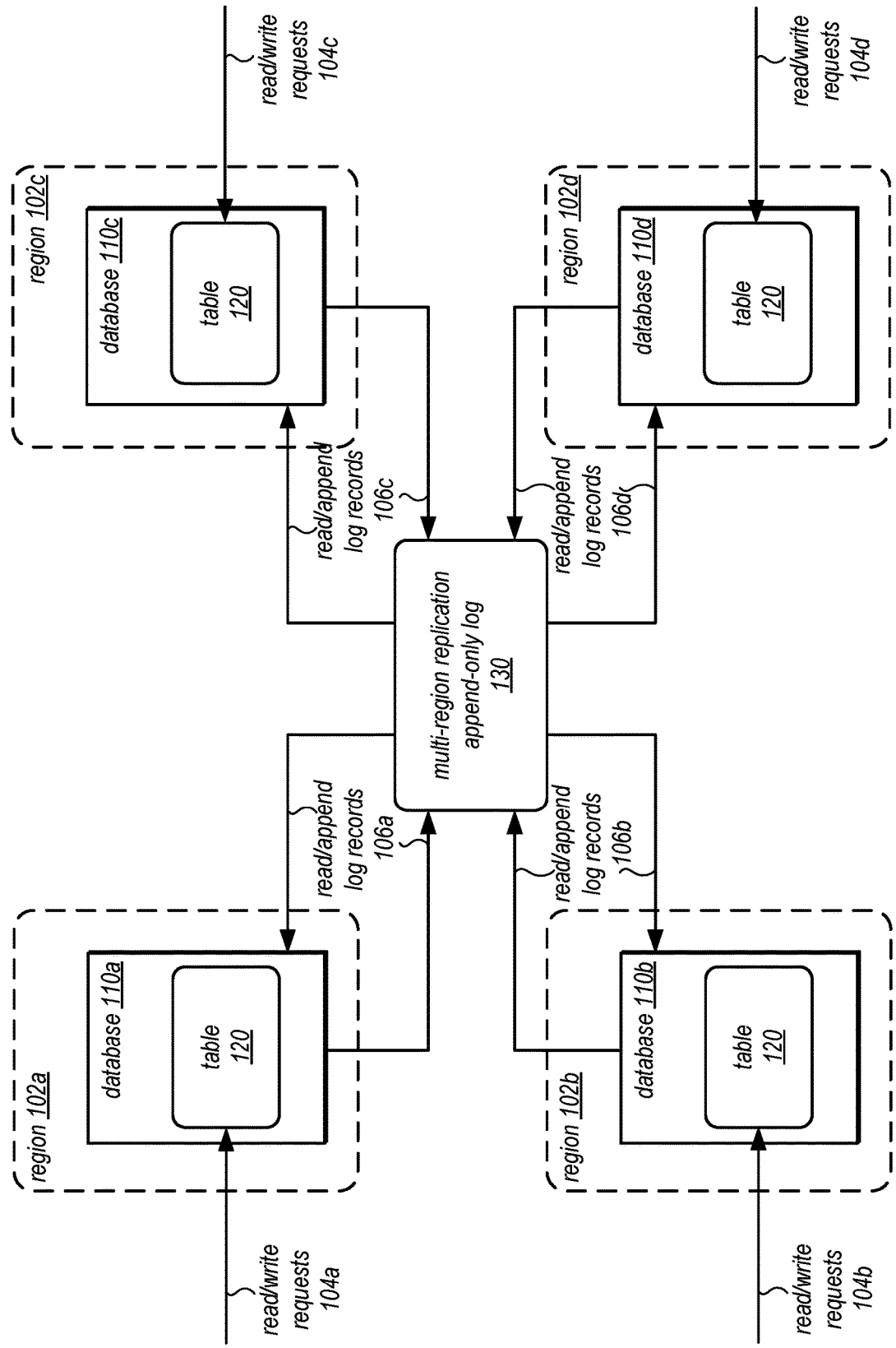
FIG. 1 is a logical block diagram illustrating synchronous cross-region replication for a multi-writer database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may describe synchronous cross-region replication for a multi-writer database. Database client applications may need to remain available even during an impairment of an entire region hosting a copy of one or more tables of a database (or an entire database). While some cross-region replication techniques exist, the data replication techniques may not provide client applications read from the different regions with the most up-to-date data during scenarios when a region is unavailable. Therefore, it should be appreciated by one of ordinary skill in the art that maintaining resiliency in the event of failures of different regions while still providing access to the most up-to-date data improves the performance of computer systems generally (e.g., database client applications) and other database system related technologies (e.g., the database itself).

For example, these techniques increase system resiliency, and also let client applications with regulatory requirements comply with regulations. Accordingly, to avoid a failure of a single region from making an update available, a write submitted in one region may have to be performed in at least two regions before the requesting client application for the write is informed that the write was completed. In other scenarios, client applications may need consistency semantics that require reading the latest data in any region (including in scenarios when there are no failures). For example, one client application may allow end users to register accounts with usernames, and require that only one user account be associated with a particular username. If this client application needs to conditionally check that a username is not already reserved (in any region) when creating a new user account, then cross-region synchronous replication may be required.

Therefore, in various embodiments, synchronous cross-region replication may support global strong consistency across all region replicas of a table. Global strongly consistent reads may be a consistency level or guarantee that reflect the results of writes issued to any region. Global strongly consistent requests are available in other region regions even if one region is impaired (including in complete outage) or network partitioned from the others. Writes and globally strongly consistent reads may fail in a region that is network partitioned from the others as they cannot be made consistent across multiple regions.

FIG. 1 is a logical block diagram illustrating synchronous cross-region replication for a multi-writer database, according to some embodiments. A table 120 may be maintained in respective copies in different regions, such as regions 102a, 102b, 102c, and 102d. Each database 110a, 110b, 110c, and 110d may include other tables that may not be replicated across regions 102. Table 120 can be written to and read from each region, as indicated at 104a, 104b, 104c, and 104d.

To ensure that each table 120 is viewed consistently and can still include the latest updates in the event of a failure of a region (e.g., table 120 still be read with up-to-date data in the event that region 102c fails or otherwise cannot communicate with other regions), each database 110 may use multi-region replication append only log 130 for table 120. Multi-region replication append-only log 130 may order writes to different items according to respective timestamps assigned to those writes. These timestamps may be assigned at the different regions 102 but may use a global ordering technique (e.g., timestamps using clock values synchronized across regions 102 using, for example, a time synchronization service, like time synchronization service 290 discussed below). To perform reads and writes 104 each database 110 may respectively read from and append to the log records in multi-region replication append only log 130, as indicated at 106a, 106b, 106c and 106d. As discussed in detail below with regard to FIGS. 3-7, these techniques may be performed to ensure that conflicting writes do not succeed no matter which region the originate at or replicate too (e.g., a write that fails at one region also fails at all other regions). For example, given recorded writes in multi-region replication append-only log 130, each database 110 can independently reason over the writes and reach the same conclusion for which writes succeed and fail and the order in which they are applied to table 120.

Please note that previous descriptions of a database, table, region, and multi-region replication append-only log are not intended to be limiting, but are merely provided as logical examples.

This specification continues with a general description of a provider network that may implement a database service that may implement cross-region replication for a multi-writer database. Then various examples of a database service are discussed, including different components/modules, or arrangements of components/module, that may be employed as part of implementing the database service, in some embodiments. A number of different methods and techniques to implement cross-region replication for a multi-writer database are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
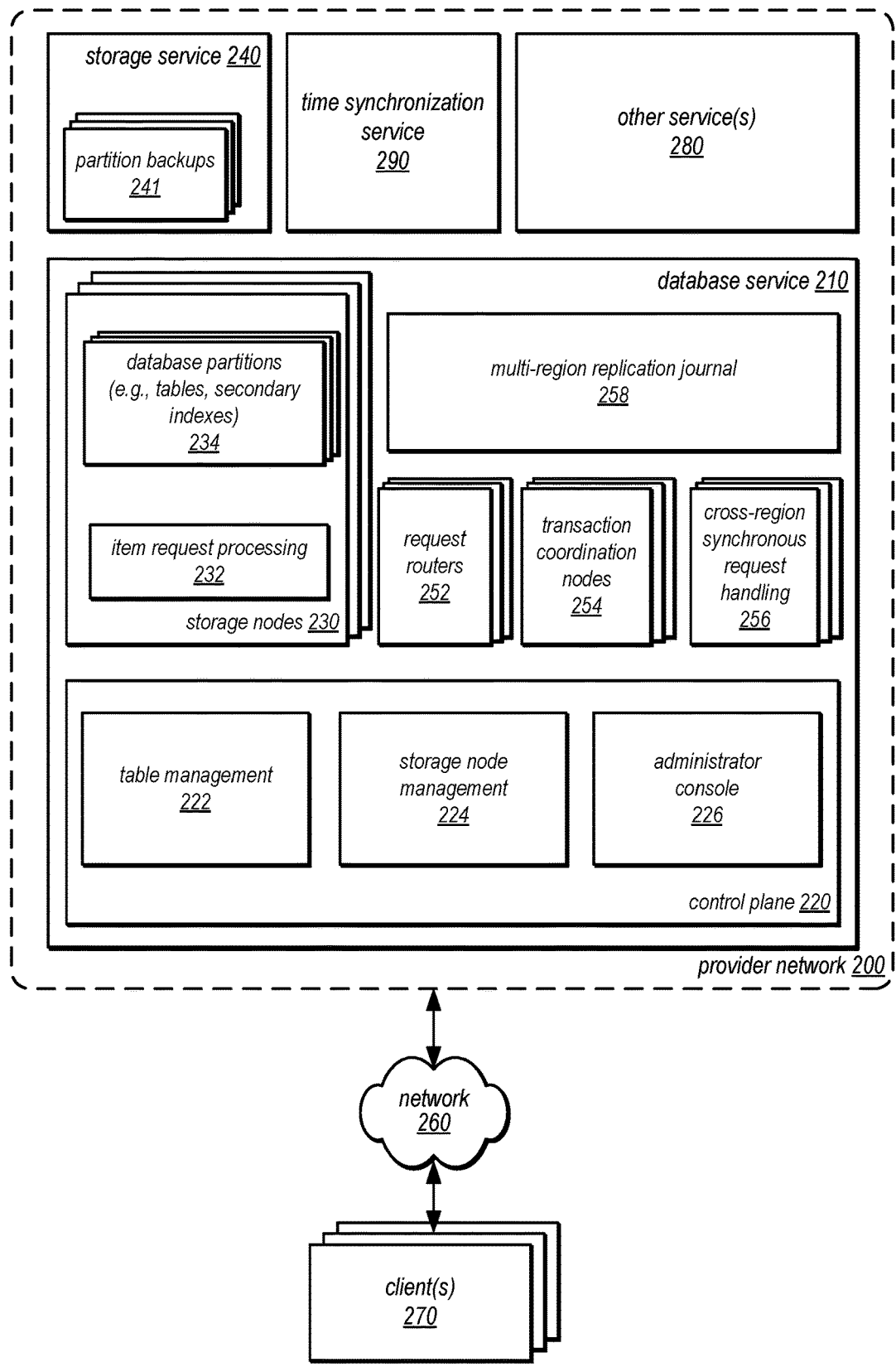
FIG. 2 is a logical block diagram illustrating a provider network offering a database service that may implement synchronous cross-region replication for a multi-writer database, according to some embodiments.

FIG. 2 is a logical block diagram illustrating a provider network offering a database service that may implement synchronous cross-region replication for a multi-writer database, according to some embodiments. In various embodiments, a provider network, such as provider network 200, may be a private or closed system or may be set up by an entity such as a company or a public sector organization to provide one or more services (such as various types of cloud-based storage, processing, or other computing resources) accessible via the Internet and/or other networks to clients 270. The provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network.

For example, the provider network (which may, in some implementations, be referred to as a "cloud provider network" or simply as a "cloud") may refer to a pool of network-accessible computing resources (such as compute, storage, and networking resources, applications, and services), which may be virtualized or bare-metal (e.g., providing direct access to underlying hardware without a virtualization platform). In this way, the provider network can provide convenient, on-demand network access to a shared pool of configurable computing resources that can be programmatically provisioned and released in response to user commands. These resources can be dynamically provisioned and reconfigured to adjust to variable load, providing a fully-managed service and/or server-less experience for users.

In various embodiments, provider network 200 can be formed as a number of regions, where a region may be a separate geographical area in which the provider network clusters or manages data centers, in some embodiments. Each region may include two or more availability zones (sometimes referred to as fault tolerant zones) connected to one another via a private high speed network, for example a fiber communication connection. An availability zone (also known as an availability domain, or simply a "zone") may refer to an isolated failure domain including one or more data center facilities with separate power, separate networking, and separate cooling from those in another availability zone, in some embodiments. Preferably, availability zones within a region are positioned far enough away from one another that the same natural disaster should not take more than one availability zone offline at the same time, in some embodiments. Clients 270 can connect to availability zones of the provider network 200 via a publicly accessible network (e.g., the Internet, a cellular communication network).

Regions may be connected to a global network which includes private networking infrastructure (e.g., fiber connections controlled by the cloud provider) connecting each region to at least one other region, in some embodiments. The provider network 200 may deliver content from points of presence outside of, but networked with, these regions by way of edge locations and regional edge cache servers, in some embodiments. This compartmentalization and geographic distribution of computing hardware enables the provider network to provide low-latency resource access to users on a global scale with a high degree of fault tolerance and stability.

In some embodiments, provider network 200 may implement various computing resources or services across one or more regions, such as database services 210 (various types of database services including SQL, NoSQL, document, graph, time series, and so on)), storage service 240, which provide various data storage services, time synchronization service 290, which synchronize local times across different regions, and other services 280, which may include a virtual compute service, data processing service(s) (e.g., map reduce, data flow, and/or other large scale data processing techniques), and/or any other type of network-based services (which may include various other types of storage, processing, analysis, communication, event handling, visualization, and security services not illustrated). The resources used to support the operations of such services (e.g., compute and storage resources) may be provisioned in an account associated with the provider network, in contrast to resources requested by users of the provider network, which may be provisioned in user accounts, in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 8 and described below. In some embodiments, the functionality of a given system or service component (e.g., a component of database service 210) may be implemented by a particular node or may be distributed across several nodes. In some embodiments, a given node may implement the functionality of more than one service system component (e.g., more than one data store component).

Database service 210 may implement various types of distributed database services, in some embodiments, for storing, accessing, and updating data in tables hosted in a database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data). In some embodiments, a query language (e.g., Structured Query Language (SQL)) may be used to specify access requests.

In some embodiments, clients 270 may encompass any type of client configurable to submit network-based requests to provider network 200 via network 260, including requests for database service 210 (e.g., to access item(s) in a table or secondary index in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

In some embodiments, database service 210 may implement control plane 220 to implement one or more administrative components, such as automated admin instances or nodes (not illustrated but which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiments. Administrator console 226 may allow system administrators to interact directly with database service 210 (and/or the underlying system). In some embodiments, the administrator console 226 may be the primary point of visibility and control for database service 210 (e.g., for configuration or reconfiguration by system administrators). For example, the administrator console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database service 210. For instance, control plane 220 may communicate with storage nodes 230 to initiate the performance of various control plane operations, such as moves of table partitions, merges of table partitions, splits of table partitions, update tables, delete tables, create secondary indexes, etc. . . . . . In some embodiments, control plane 220 may include a node recovery feature or component that handles failure events for storage nodes 230, propagation architectures 290 and request routers 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect merge, split, copy, or move events for partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical filesystem mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table/index creation and management 222 to manage the creation (or deletion) of database tables and/or secondary indexes hosed in database service 210, in some embodiments. For example, a request to create a secondary index may be submitted via administrator console 226 (or other database service 210 interface) which may initiate performance of a workflow to generate appropriate system metadata (e.g., a table identifier that is unique with respect to all other tables in database service 210, secondary index performance or configuration parameters, and/or various other operations for creating a secondary index as discussed below). Backup management (not illustrated) may handle or manage backup requests to make copies as of a version or point-in-time of a database, as partition snapshots 242 and partition change log(s) 244 that together makeup partition backup(s) 241 in storage service 240 which may be used to perform an offline build of a replicated data set like a secondary index.

Database service 210 may implement request routers 250, in some embodiments. Request routers 250 may receive and parse client access requests, in various embodiments in order to determine various features of the request, to parse, authenticate, throttle and/or dispatch access requests, among other things, in some embodiments.

In some embodiments, database service 210 may also implement a plurality of storage nodes 230, each of which may manage one or more partitions of a database table or secondary index on behalf of clients/users or on behalf of database service 210 which may be stored in database storage 234 (on storage devices attached to storage nodes 230 or in network storage accessible to storage nodes 230).

Storage nodes 230 may implement item request processing 232, in some embodiments. Item request processing 232 may perform various operations (e.g., read/get, write/update/modify/change, insert/add, delete/remove, or conditional write) to access individual items stored in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model).

In some embodiments, database service 210 may provide functionality for creating, accessing, and/or managing tables or secondary indexes at nodes within a multi-tenant environment. For example, database partitions 234 may store table item(s) from multiple tables, indexes, or other data stored on behalf of different clients, applications, users, accounts or non-related entities, in some embodiments.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210. In some embodiments, a replica group may include a primary storage node which may act as, for instance, a read-write node, for the partition. A primary storage node of a replica group may also be involved in the management of partition. Moreover, different replica groups may utilize overlapping nodes, where a storage node 230 may be a member of multiple replica groups, maintaining replicas for each of those groups whose other storage node 230 members differ from the other replica groups.

Different models or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more key-value pairs, in any order, in some embodiments. In some embodiments, each attribute in an item may have a key, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s) and version attributes, in some embodiments. In some embodiments, the tables maintained by the database service 210 (and the underlying storage system) may have no pre-defined format other than their reliance on the primary key. Accordingly, a table may, in some embodiments, not include the same numbers or types of columns in each row. In some embodiments, tables may referred to as a collection, document store, of various other set of items with varying attributes.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes, and create and/or associate functions with tables. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store partition snapshots as backups 241. Storage service 240 may implement striping, sharding, or other data distribution techniques so that different portions of a partition backup 241 are stored across multiple locations (e.g., at separate nodes). In at least some embodiments, update logs (e.g., created by updates for database partitions by item request processing 232) may be stored as objects in storage service 240.

In some embodiments, requests to convert, enable, or disable synchronous global replication of a datable in multiple regions of a provider network may be supported (e.g., via requests to control plane 220 via administrator console 226). For example a request to convert an existing global table that performs asynchronous replication to synchronous replication may be performed. To perform this request, table management 222 may create or establish various data and metadata information to create a multi-region replication log in multi-region replication journal 258 and update request routers 252, and begin enabling the use of system attributes to be stored for item attribute values (e.g., timestamps, source of updates, etc.). As discussed in detail below with regard to FIGS. 3-5, request routers 252 and cross-region synchronous request handling nodes 356 may work together with multi-region replication journal 258 in order to implement synchronous cross-region replication for a multi-writer database table. Although not illustrated, write requests may be writes received and initially dispatched to transaction coordination nodes 254, which may handle transactions and dispatch the performance of individual operations with respect to a table replicated across regions synchronously to cross-region synchronous request handling 256).

Figure 3:
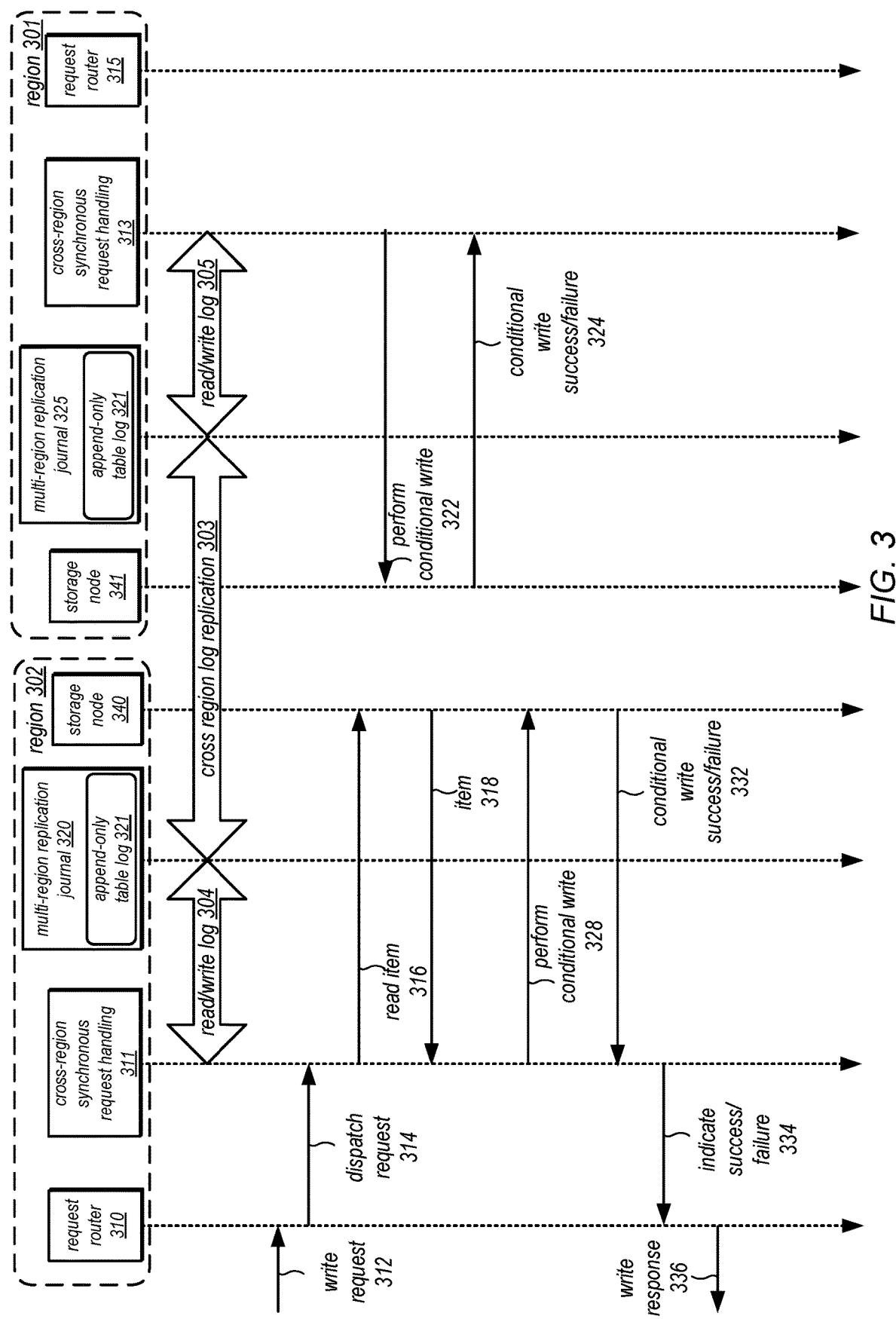
FIG. 3 is a logical block diagram illustrating interactions to perform a write request received for a synchronously replicated table across regions, according to some embodiments.

FIG. 3 is a logical block diagram illustrating interactions to perform a write request received for a synchronously replicated table across regions, according to some embodiments. Each region maintaining a replica of a table may communicate updates to the table via a shared log, such as append-only table log 321, as discussed in detail above with regard to FIG. 1. Each instantiation (e.g., participant) that updates and provides access to append-only table log 321 (e.g., multi-region replication journal 320 in region 302 and multi-region replication journal 325 in region 301) may be in frequent or continuous communication, as indicated at 303, according to the respective consensus protocol used for maintaining append-only table log 321 across regions (as discussed in detail below with regard to FIG. 5).

Figure 4:
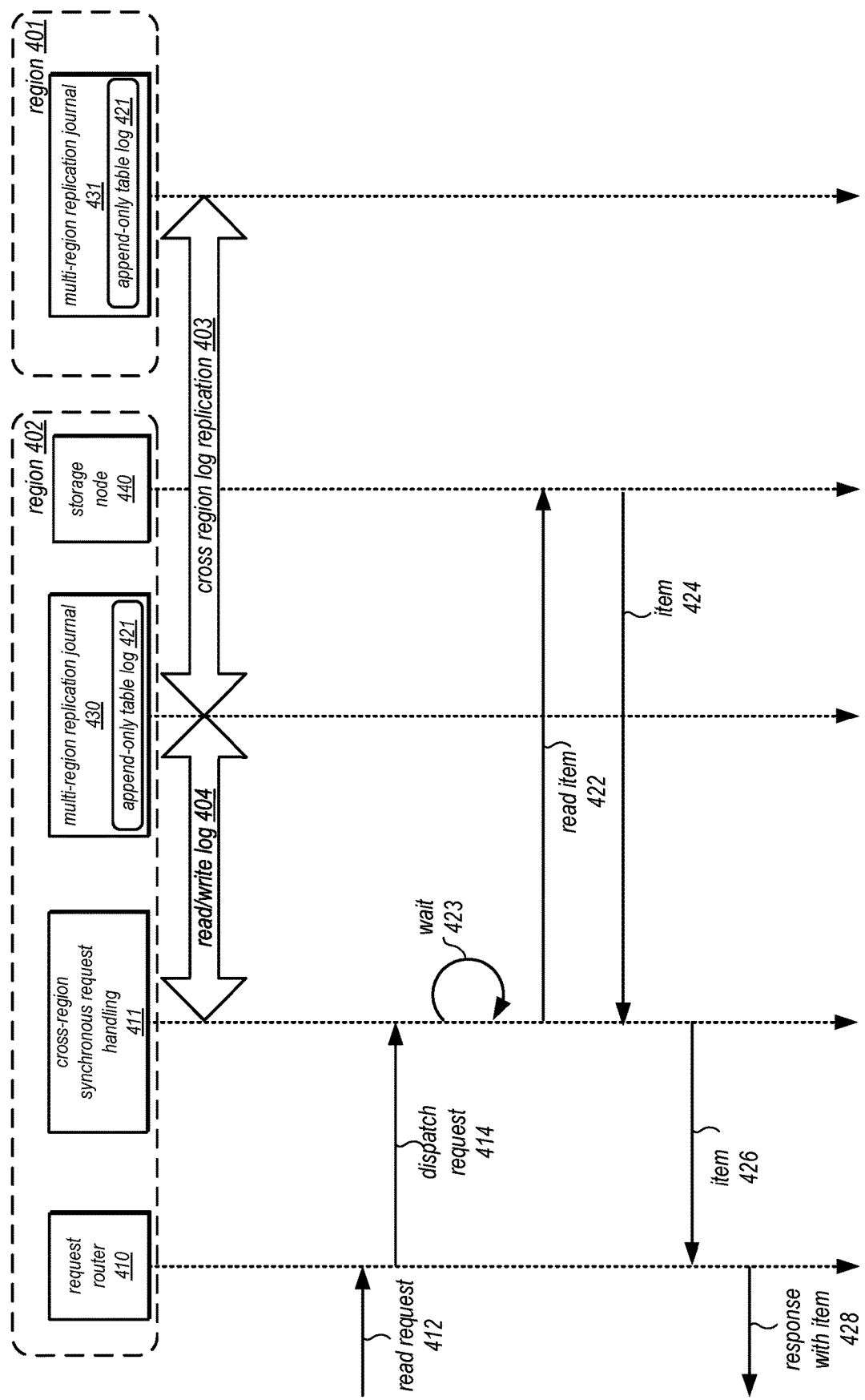
FIG. 4 is a logical block diagram illustrating interactions to perform a read request received for a synchronously replicated table across regions, according to some embodiments.

Cross-region synchronous request handling nodes, 311 and 313, may respectively handle interactions to read and write from append-only table log 321, as indicated at 304 and 305. Various styles of interactions may be implemented to read and write 304 and 305 from append-only table log 321. For example, in some embodiments, a pull-based model, where cross-region synchronous request handling 311 specifically requests to read from append-only table log 321 and write from append-only table log 321 may be implemented (not illustrated). In other embodiments, a push-based model, where cross-region synchronous request handling 311 receives log records from append-only table log 321 when they are confirmed by multi-region replication journal 320 (e.g., similarly for multi-region replication journal 325 with respect to cross-region synchronous request handling 313). For instance, read/write log 304 and 305 interactions may be one (or more) background processes or threads, which may listen for updates and push out new updates in singly and/or in batches. In this way, other request handling flows (e.g., for reads and writes as depicted in FIGS. 3 and 4) may not be "waiting" on specific requests to read/append to append-only table log 321.

A write request 312 is received at request router 310 in region 302. Request router 310 may dispatch the request, as indicated 314, to the assigned cross-region synchronous request handling 311. Although not illustrated, cross-region synchronous request handling node 311 may implement a daemon or other component of time synchronization service 290, which may provide a globally, synchronized clock time according to a time synchronization service 290. In this way, clock times used to assign/determine a timestamp for writes (or reads) received at cross-region synchronous request handling nodes 311 and 313 (or any other region) can accurately assign timestamps. For example, the time synchronization service 290 may provide a range of time for which a point in time can be considered to be accurate. This range may be described as clock boundaries, "Clockbound."

The use of Clockbound may be to assign a time value (e.g., timestamp) to database system actions in order to support accurate ordering of writes to items in time (e.g., the write received at one region with a timestamp before the timestamp of a write for the same item received at another region was actually before the later write (and not, for example, erroneously considered earlier because of clock-skew between local clocks maintained at different regions).

Different items of a table that is stored across multiple partitions may use a number of different cross-region synchronous request handling nodes assigned to different partition(s), in some embodiments. Therefore, request router 310 may, in some embodiments, access a node mapping between cross-region synchronous request handling nodes 311 for a table and particular partitions or other ranges/portions of the table to identify node 311 for write request 312.

Cross-region synchronous request handling 311 may read the item 316 from storage node 340. The item may be returned, as indicated at 318. Cross-region synchronous request handling 311 may use the item as the current local version. Cross-region synchronous request handling 311 may view, read, or otherwise obtain the item log record(s) from append-only table log 321 at multi-region replication journal 330. These item log records may correspond to other region writes for the same item. Cross-region synchronous request handling 311 may generate an updated version of the item in accordance with the write request and the obtained log records. For example, each log record may describe a value of the item, timestamp, and corresponding condition to be satisfied for the log record to be applied so that the sequence of log records can be reasoned over to determine the updated version (e.g., a timestamp value of a previous write to the item, such as Record A {item x='5', timestamp='10', condition=(if x.current_timestamp==null), Record B {item x='6', timestamp='13', condition=(if x.current_timestamp==10), Record C {item x='8', timestamp='22', condition=(if x.current_timestamp==13)). In this way, conflicting writes (e.g., writes where the condition is not satisfied based on timestamp ordering provided in the log are not performed (because they conflict).

The updated version of the item may be generated based on the write request and the obtained log records, and appended to append only table log 321 as part of read/write log 304. For example, if the write says x='7', timestamp='25', and condition is if x.current_timestamp==22, then the updated version may be x='7'. A conditional write may be performed, as indicated at 328, to store the update. The condition may be based on the timestamp determined for the write request (e.g., by cross-region synchronous request handling 311 when it is received using clock-values based on a synchronized time range provided by time sync service 290 (discussed above with regard to FIG. 2), such as "x.current_timestamp==22" in the above example). If the condition fails at storage node 340, then the write is not applied. This could occur because a new write could have been received from multi-region replication journal 320 in append-only table log 321 (e.g., background read/write 304) with an earlier timestamp (e.g., <25 that was performed and succeeded prior to the other write) as in various embodiments, read/write log and cross-region synchronous request handling 311 may be performing requests both on what was received from request router 310 and also from the append-only table log 321 from another region. For instance, as illustrated in FIG. 3, the same conditional write may be performed, as indicated at 322 (for write request 312), and success/failure received 324. Both storage node 341 and storage node 340 should reach the same conclusion about the condition in each region. Success or failure for write request 312 may be passed through, as indicated at 332 and 334 to provide a write response 336.

FIG. 4 is a logical block diagram illustrating interactions to perform a read request received for a synchronously replicated table across regions, according to some embodiments. Similar to the discussion above with regard to FIG. 3, each region maintaining a replica of a table may communicate updates to the table via a shared log, such as append-only table log 421, as discussed in detail above with regard to FIG. 1. Each instantiation (e.g., participant) that updates and provides access to append-only table log 421 (e.g., multi-region replication journal 420 in region 402 and multi-region replication journal 431 in region 401) may be in frequent or continuous communication, as indicated at 403, according to the respective consensus protocol used for maintaining append-only table log 421 across regions (as discussed in detail below with regard to FIG. 5). Cross-region synchronous request handling node, 411, may respectively handle interactions to read and write from append-only table log 421, as indicated at 404. Various styles of interactions may be implemented to read and write 404 from append-only table log 421. For example, in some embodiments, a pull-based model, where cross-region synchronous request handling 411 specifically requests to read from append-only table log 421 and write from append-only table log 421 may be implemented (not illustrated). In other embodiments, a push-based model, where cross-region synchronous request handling 411 receives log records from append-only table log 421 when they are confirmed by multi-region replication journal 430. For instance, read/write log 404 interactions may be one (or more) background processes or threads, which may listen for updates and push out new updates in singly and/or in batches.

A read request 412 is received at request router 410 in region 402. Request router 410 may dispatch the read request, as indicated 414, to the assigned cross-region synchronous request handling node 411. Different items of a table that is stored across multiple partitions may use a number of different cross-region synchronous request handling nodes assigned to different partition(s), in some embodiments.

Cross-region synchronous request handling 411 may assign a timestamp for read request 412 (e.g., using the time synchronization service 290 as discussed above). Cross-region synchronous request handling 411 may also obtain the log record(s) for the item from append-only table log 421 at multi-region replication journal 430 (e.g., via read/write log 404). These item log records may correspond to other region writes that are inflight (or writes at region 402 that have not yet been completed). As indicated at 423, cross-region synchronous request handling node 411 may wait until the timestamps of records earlier than the assigned timestamp of the read request have been processed by cross-region request handling node 411. For example, wait 432 may happen until a timestamp value is seen that occurs after the timestamp of read request 412 (in this way, any writes with earlier timestamps that are slow to replicate may have been seen). In some embodiments, multi-region replication journal 430 may insert a heartbeat write to advance the timestamp (but not change the value). In this way, wait 423 does not happen indefinitely (in the event no writes arrive to have a later timestamp).

Once wait 423 is completed, cross-region synchronous request handling 411 may send a request to read the item, as indicated at 422, from storage node 440. The item may be returned 424 and passed back, as indicated 426 in order to provide a response with the item, as indicated at 428.

Although FIG. 4 depicts a wait-based technique to perform reads, in some embodiments, a read request can be performed by appending a read-request log record, which does not change the value of the item but does have a time-based condition so that the read value is only returned if the time-based condition succeeds.

Figure 5:
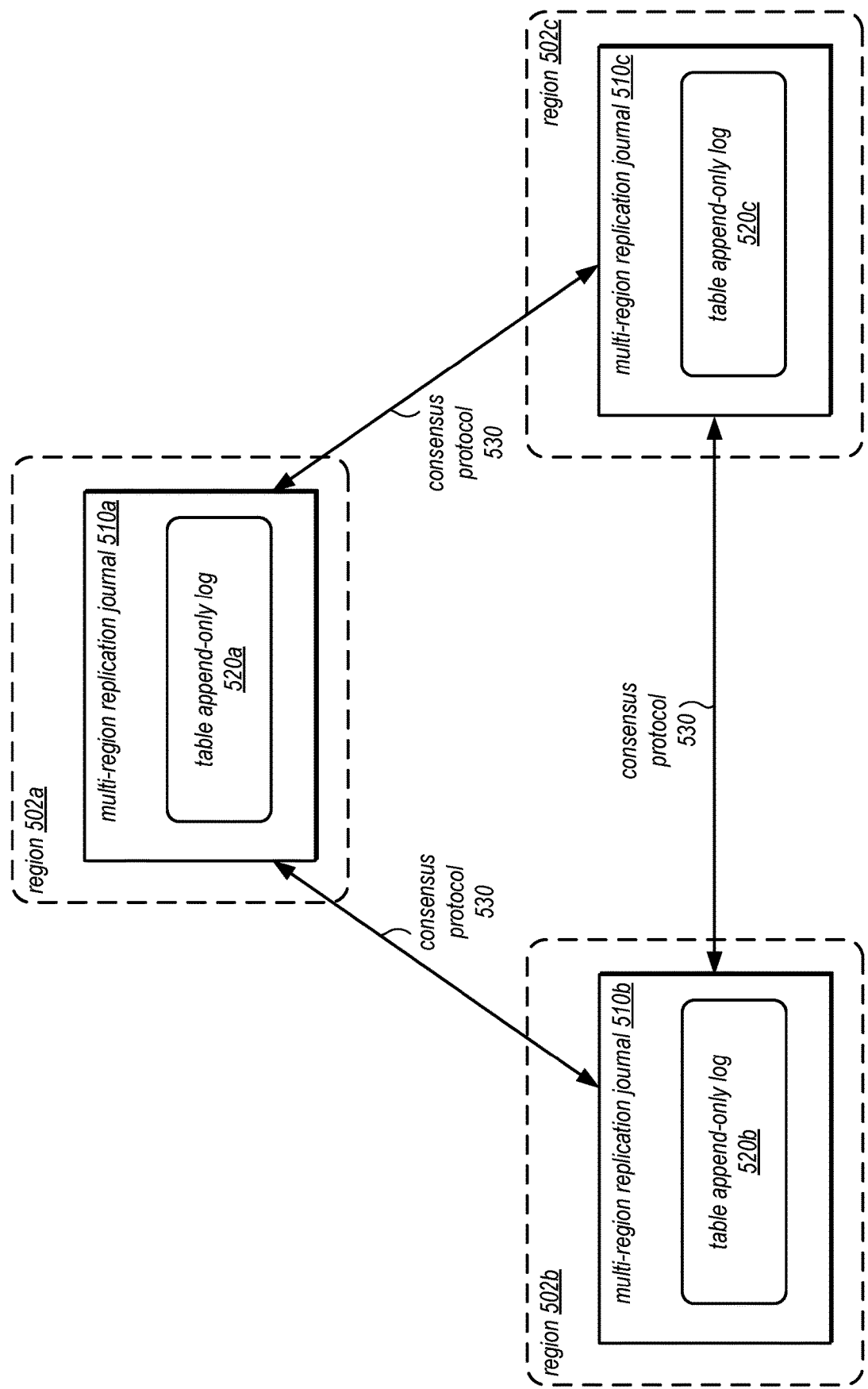
FIG. 5 is a logical block diagram illustrating replication of a table append-only log across different regions, according to some embodiments.

FIG. 5 is a logical block diagram illustrating replication of a table append-only log across different regions, according to some embodiments. Different regions of a provider network, 502a, 502b, and 502c, may host respective instantiations of multi-region replication journal 258 (discussed above with regard to FIG. 2), as depicted at 510a, 510b, and 510c. For a table, copies of an append-only log, such as 520a, 520b, and 520c, may be maintained and used to perform replication of writes to the table in synchronous fashion, as discussed above with regard to FIGS. 3 and 4. Each multi-region replication journal 510 may implement an internal replication, durability and consensus technique (not illustrated). For example, chain replication techniques may be implemented to maintain a highly durable and highly available copy of the append-only log 520 when writes are sent to be appended to table append-only log 520 by a cross-region synchronous request handling node (as discussed above with regard to FIGS. 2-3). In chain replication, a sequence of nodes maintaining the local copy of the append-only log receives and performs an update (e.g., the appended log records). A head node stores a copy of the log, which then propagates the update (e.g., log record to be appended back through each node in the sequence of nodes until a last node, a tail node appends the log. The append-only log is read from the tail node.

Once submitted to the local table append-only log (e.g., at 520a), consensus protocol 530 may be implemented in order to ensure that the write is durably replicated to other copies of the table append-only log (e.g., at 520b and 520c). Different consensus protocol techniques 530 can be implemented. For example, a Paxos-based technique or other consensus protocol that can survive failures of individual participants (e.g., failures of individual regions), with different regions acting in different roles (e.g., proposer, acceptor, and learner) for each write to append. Other consensus protocols, such as a two-phase commit, may be implemented.

Figure 6:
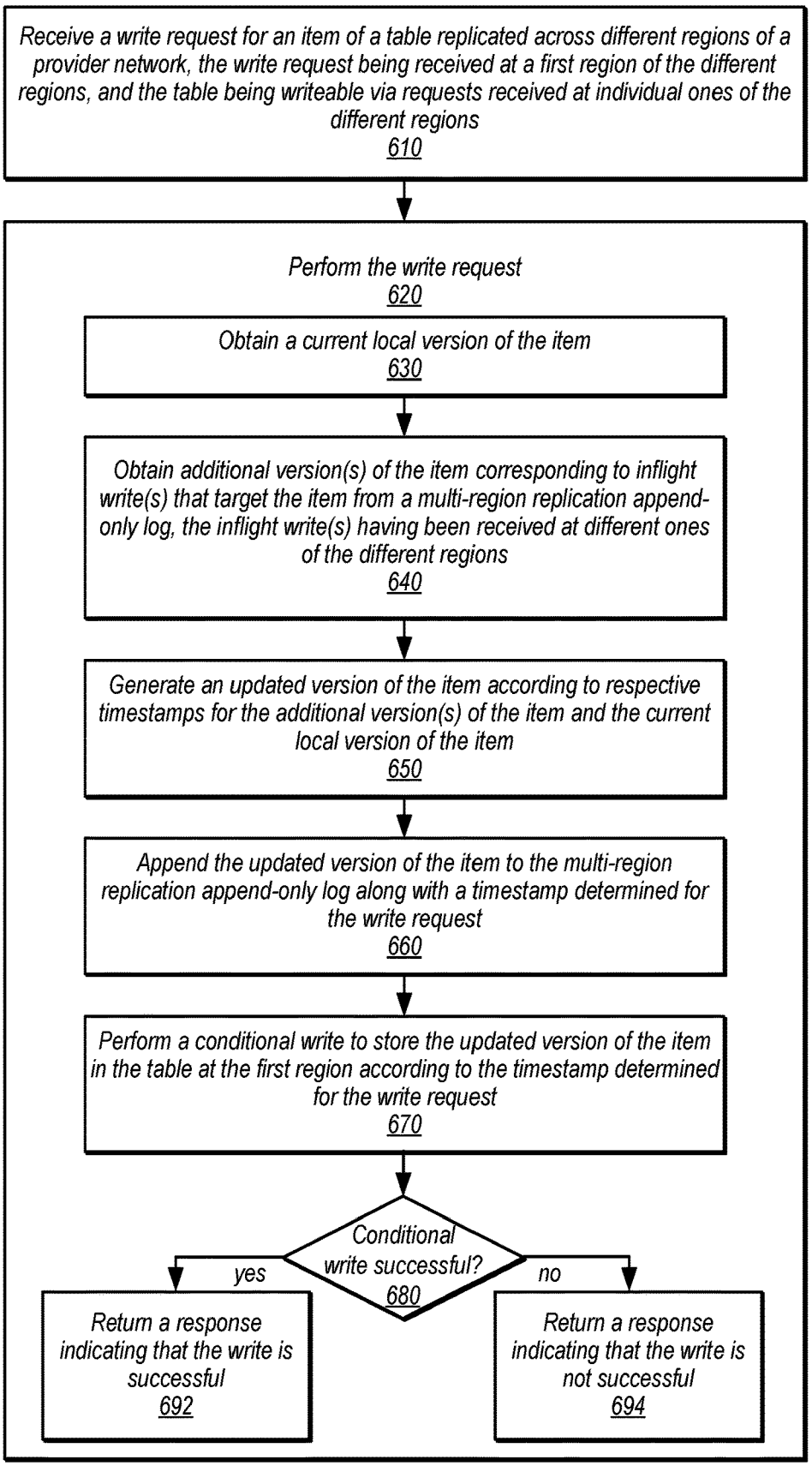
FIG. 6 is a high-level flowchart illustrating various methods and techniques to implement performing a write request for in a synchronous cross-region replication for a multi-writer database, according to some embodiments.

The examples of a database that implements synchronous cross-region replication for a multi-writer database as discussed in FIGS. 2-5 above have been given in regard to a database service (e.g., a relational database, a document database, a non-relational database, etc.). However, various other types of database systems or storage systems can advantageously implement synchronous cross-region replication for a multi-writer database, in other embodiments. FIG. 6 is a high-level flowchart illustrating various methods and techniques to implement performing a write request for in a synchronous cross-region replication for a multi-writer database, according to some embodiments. These techniques, as well as the techniques discussed with regard to FIG. 7, may be implemented using components or systems as described above with regard to FIGS. 2-5, as well as other types of databases or storage systems, and thus the following discussion is not intended to be limiting as to the other types of systems that may implement the described techniques.

As indicated at 610, a write request for an item of a table that is replicated across different regions of a provider network may be received, in some embodiments. The write request may be received at a first region of the different regions. The table may be writeable via requests received at individual ones of the different regions, in some embodiments.

As indicated at 620, the write request may be performed, in some embodiments. To perform the write request, as indicated at 630, a current local version of the item may be obtained. As indicated at 640, additional version(s) of the item corresponding to inflight write(s) that target the item from a multi-region replication append-only log may be obtained. Inflight writes may refer to writes that have been durably added to the multi-region replication append-only log (even if they have not been processed/performed for the respective copies of the table. The inflight write(s) may have been received at different ones of the different regions (although one or more of them could have also been received at the same region). In some scenarios, there may be no inflight writes for the item. As discussed above, this may be a background process that operates continuously (e.g., in push-based fashion independent of the receipt of the write request), in some embodiments As indicated at 650, an updated version of the item may be generated according to respective timestamps for the additional version(s) of the item and the current local version of the item, in some embodiments. For example, the log records may indicate whether other writes that are ordered prior to the current write's timestamp should be included in the updated version of the item (e.g., if they are relative values, such as x=x+1, etc.). As indicated at 660, the updated version of the item may be appended to the multi-region replication append-only log along with a timestamp determined for the write request, in some embodiments. In this way, other regions may read the write from the append-only log and process it (e.g., either apply the write request or determine that the write does not succeed based on a success/failure indication in that other region, as discussed above with regard to FIG. 3). The timestamp determined for the write request may be determined using a local clock time or a global clock time synchronized according to a time synchronization service 290 as discussed above with regard to FIG. 3 may be performed.

As indicated at 670, a conditional write may be performed to store the updated version of the item in the table at the first region according to the timestamp determined for the write request, in some embodiments. The condition may be a timestamp that was obtained for the current local version when the current location version was obtained. In some embodiments, pipelining techniques may be implemented so that the conditional write is performed as part of a batch of conditional write requests that are performed in timestamp order (e.g., each request is performed according to the determined timestamp value of the write request). If the conditional write was successful, as indicated by the positive exit from 680, a response indicating that the write is successful may be returned, as indicated at 692, in some embodiments. If, however, the conditional write was not successful, as indicated by the negative exit from 680, a response indicating that the write is successful may be returned, as indicated at 694, in some embodiments. As noted above with regard to FIG. 3, each region may read the write from the multi-region replication append-only log and attempt to perform and reach the same determination of success or failure for the write, in some embodiments.

FIG. 7 is a high-level flowchart illustrating various methods and techniques to implement performing a read request for in a synchronous cross-region replication for a multi-writer database, according to some embodiments. As indicated at 710, a read request for an item of a table that is replicated across different regions of a provider network may be received, in some embodiments. The read request may be received at a first region of the different regions. The table may be writeable via requests received at individual ones of the different regions, in some embodiments.

As indicated at 720, the read request may be performed, in some embodiments. To perform the read request, as indicated at 730, a timestamp may be assigned for the read request, in some embodiments. For example, a local clock time or a global clock time synchronized according to a time synchronization service 290 as discussed above with regard to FIG. 3 may be performed. As indicated at 740, a multi-region replication append-only log may be accessed to obtain any inflight write(s) that were received at different ones of the different regions. As discussed above, this may be a background process that operates continuously (e.g., in push-based fashion independent of the receipt of the read request), in some embodiments. As indicated at 750, until those inflight write(s) with respective timestamps earlier than the timestamp assigned for the read request have been performed, performance of the read request may wait, in some embodiments. For example, wait may be performed until a timestamp later than the assigned timestamp of the read is seen from the multi-region replication append-only log. Also noted above, a heartbeat technique or other mechanism to periodically advance the timestamp in the log may be performed so that reads do not wait indefinitely if no writes are performed.

After waiting, as indicated at 760, a local version of the item at the first region may be obtained, in some embodiments. As indicated at 770, the local version of the item may be returned in response to the read request, in some embodiments.

Although not depicted, read requests may be alternatively performed using log records added to the multi-region replication append-only log and processed similar to write requests in order to determine if a read succeeds for a particular value or is delayed.

The methods described herein may in various embodiments be implemented by any combination of hardware and software. For example, in some embodiments, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
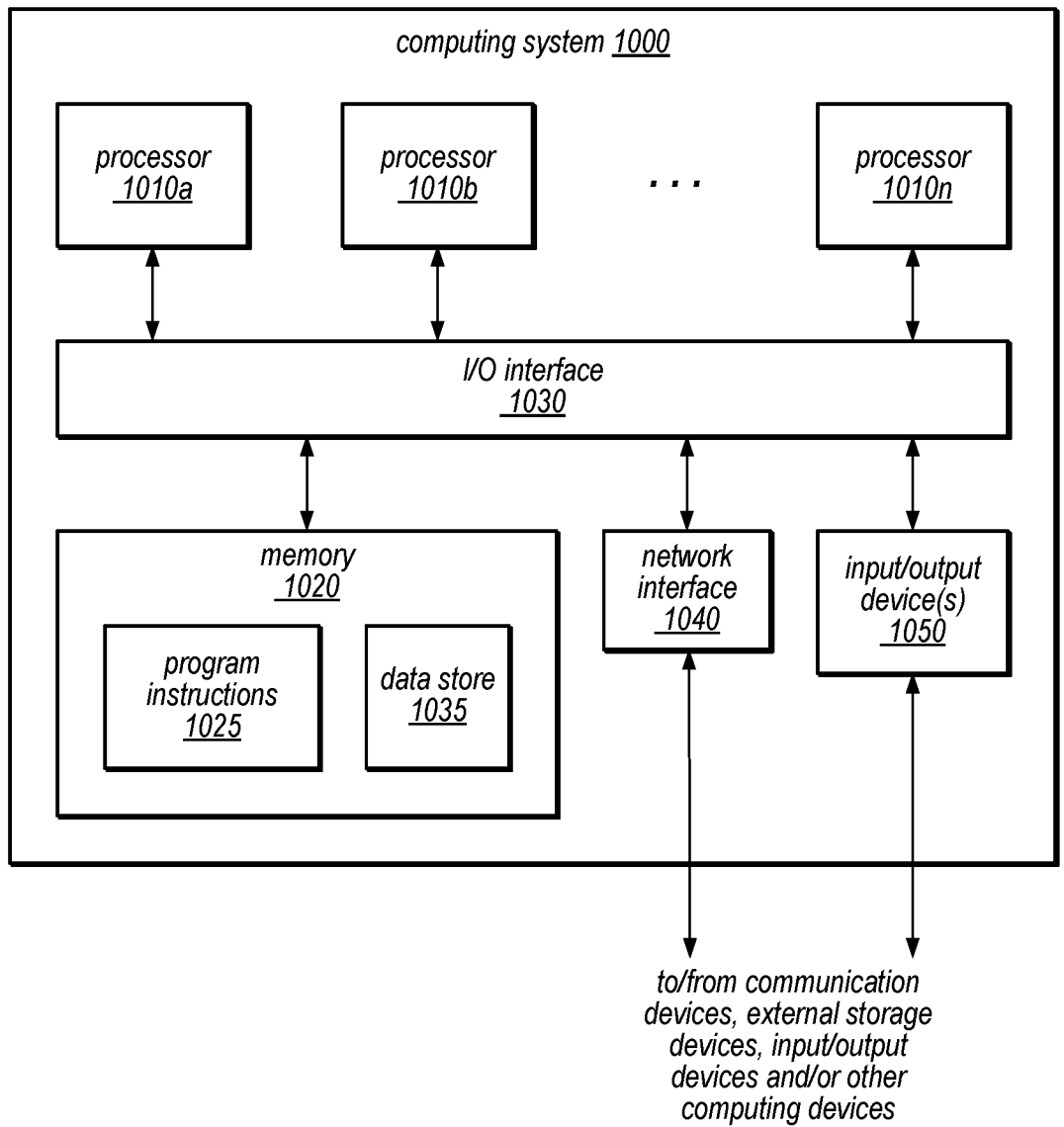
FIG. 8 is a block diagram illustrating an example computing system, according to some embodiments.

Embodiments to implement a lightweight filesystem for remote storage caching as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement a lightweight filesystem for remote storage caching, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to perform offline builds for projected data subsets are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various embodiments of the systems as described herein, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a plurality of computing devices, respectively implementing a processor; and at least one memory, that implement a database service of a provider network, wherein the database service is configured to:
   receive a write request for an item of a table from a client;
   determine that the table is replicated across a plurality of regions of the provider network, wherein the write request is received at a first region of the plurality of regions, wherein the table is writeable via requests received at individual ones of the plurality of regions;
   dispatch the write request to a cross-region synchronous request handling node of the database service assigned the item of the table;
   wherein the cross-region synchronous request handling node is configured to:
   read a current local version of the item from a storage node of the database service;
   read a multi-region replication append-only log to obtain one or more additional versions of the item corresponding to one or more inflight writes that target the item, wherein the one or more inflight writes were received at different ones of the plurality of regions;
   generate an updated version of the item according to respective timestamps for the one or more additional versions of the item and the current local version of the item;
   append the updated version of the item to the multi-region replication append-only log along with a timestamp determined for the write request;
   send a request to perform a conditional write to store the updated version of the item in the table in the storage node at the first region according to the timestamp determined for the write request; and
   after receipt of an indication that the conditional write to the store the updated version of the item succeeded at the storage node, return a response acknowledging the write request as successful.

2. The system of claim 1, wherein the database service is further configured to receive a request to create the table that enables cross-region synchronous replication for the table, wherein the multi-region replication append-only log is created in response to the request to enable cross-region synchronous replication for the table.

3. The system of claim 1, wherein the cross-region synchronous request handling node is further configured to:
   receive a read request for a different item of the table;
   assign a timestamp for the read request;
   obtain one or more inflight writes that target the different item from the multi-region replication append-only log;
   wait until those inflight writes with respective timestamps earlier than the timestamp assigned for the read request have been performed;
   obtain a local version of the different item; and
   return a response that includes the local version of the different item.

4. The system of claim 1, wherein the table is hosted by a non-relational database service implemented as part of the provider network.

5. A method, comprising:
receiving a write request for an item of a table replicated across a plurality of regions of a provider network, wherein the write request is received at a first region of the plurality of regions, wherein the table is writeable via requests received at individual ones of the plurality of regions;
performing the write request for the item of the table, comprising:
obtaining a current local version of the item;
obtaining one or more additional versions of the item corresponding to one or more inflight writes that target the item from a multi-region replication append-only log, wherein the one or more inflight writes were received at different ones of the plurality of regions;
generating an updated version of the item according to respective timestamps for the one or more additional versions of the item and the current local version of the item;
appending the updated version of the item to the multi-region replication append-only log along with a timestamp determined for the write request;
performing a conditional write to store the updated version of the item in the table at the first region according to the timestamp determined for the write request; and
after determining that the conditional write to the store the updated version of the item succeeded, returning a response acknowledging the write request as successful.

6. The method of claim 5, further comprising receiving a request to create the table that enables cross-region synchronous replication for the table, wherein the multi-region replication append-only log is created in response to the request to enable cross-region synchronous replication for the table.

7. The method of claim 5, further comprising receiving a request to convert from asynchronous cross-region replication to synchronous cross-region replication for the table, wherein the multi-region replication append-only log is created in response to the request to convert to synchronous cross-region replication for the table.

8. The method of claim 5, further comprising maintaining the multi-region replication append-only log across the plurality of regions according to a Paxos-based consensus protocol.

9. The method of claim 5, wherein the conditional write is performed as part of a pipeline of conditional write requests that are performed in timestamp order.

10. The method of claim 5, wherein the write request is successfully performed in another one of the plurality of regions according to a conditional write to store the updated version of the item using a condition specified for the write request that included in a log record append for the write request in the multi-region replication append-only log.

11. The method of claim 5, further comprising:
receiving a read request for a different item of the table;
performing the read request for the different item of the table, comprising:
assigning a timestamp for the read request;
obtaining one or more inflight writes that target the different item from the multi-region replication append-only log;
waiting until those inflight writes with respective timestamps earlier than the timestamp assigned for the read request have been performed;
obtaining a local version of the different item; and
returning a response that includes the local version of the different item.

12. The method of claim 5, wherein the write request is received as part of a transaction.

13. The method of claim 5, further comprising:
receiving a different write request for a different item of the table;
performing the different write request for the different item of the table, comprising:
obtaining a current local version of the different item;
obtaining one or more additional versions of the different item corresponding to one or more inflight writes that target the different item from the multi-region replication append-only log;
generating an updated version of the different item according to respective timestamps for the one or more additional versions of the different item and the current local version of the different item;
appending the updated version of the different item to the multi-region replication append-only log along with a timestamp determined for the different write request;
performing a conditional write to store the updated version of the different item in the table at the first region according to the timestamp determined for the different write request; and
after determining that the conditional write to store the updated version of the different item failed, returning a response indicating the different write request failed.

14. One or more non-transitory, computer-readable storage media, storing program instructions that when executed on or across one or more computing devices cause the one or more computing devices to implement:
receiving a write request for an item of a table replicated across a plurality of regions of a provider network, wherein the write request is received at a first region of the plurality of regions, wherein the table is writeable via requests received at individual ones of the plurality of regions;
performing the write request for the item of the table, comprising:
obtaining a current local version of the item;
obtaining one or more additional versions of the item corresponding to one or more inflight writes that target the item from a multi-region replication append-only log, wherein the one or more inflight writes were received at different ones of the plurality of regions;
generating an updated version of the item according to respective timestamps for the one or more additional versions of the item and the current local version of the item;
appending the updated version of the item to the multi-region replication append-only log along with a timestamp determined for the write request;
performing a conditional write to store the updated version of the item in the table at the first region according to the timestamp determined for the write request; and
after determining that the conditional write to the store the updated version of the item succeeded, returning a response acknowledging the write request as successful.

15. The one or more non-transitory, computer-readable storage media of claim 14, storing further program instructions that when executed on or across the one or more computing devices cause the one or more computing devices to further implement receiving a request to create the table that enables cross-region synchronous replication for the table, wherein the multi-region replication append-only log is created in response to the request to enable cross-region synchronous replication for the table.

16. The one or more non-transitory, computer-readable storage media of claim 14, storing further program instructions that when executed on or across the one or more computing devices cause the one or more computing devices to further implement maintaining the multi-region replication append-only log across the plurality of regions according to a Paxos-based consensus protocol.

17. The one or more non-transitory, computer-readable storage media of claim 14, wherein the conditional write is performed as part of a pipeline of conditional write requests that are performed in timestamp order.

18. The one or more non-transitory, computer-readable storage media of claim 14, storing further program instructions that when executed on or across the one or more computing devices cause the one or more computing devices to further implement:

receiving a read request for a different item of the table;
performing the read request for the different item of the table, comprising:
    assigning a timestamp for the read request;
    obtaining one or more inflight writes that target the different item from the multi-region replication append-only log;
    waiting until those inflight writes with respective timestamps earlier than the timestamp assigned for the read request have been performed;
    obtaining a local version of the different item; and
    returning a response that includes the local version of the different item.

19. The one or more non-transitory, computer-readable storage media of claim 14, wherein the write request is received as part of a transaction from a transaction coordinator node.

20. The one or more non-transitory, computer-readable storage media of claim 14, wherein the table is hosted by a non-relational database service implemented as part of the provider network.

\* \* \* \* \*